United States Patent
Lee

(10) Patent No.: US 9,465,747 B2
(45) Date of Patent: Oct. 11, 2016

(54) CONTROLLER FOR CONTROLLING NON-VOLATILE MEMORY AND SEMICONDUCTOR DEVICE INCLUDING THE SAME

(71) Applicant: SK hynix Inc., Gyeonggi-do (KR)

(72) Inventor: Jong Min Lee, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 225 days.

(21) Appl. No.: 14/535,049

(22) Filed: Nov. 6, 2014

(65) Prior Publication Data

US 2015/0347312 A1 Dec. 3, 2015

(30) Foreign Application Priority Data

Jun. 3, 2014 (KR) .......................... 10-2014-0067860

(51) Int. Cl.
*G06F 12/10* (2016.01)

(52) U.S. Cl.
CPC .......... *G06F 12/10* (2013.01); *G06F 2212/202* (2013.01); *G06F 2212/2532* (2013.01); *G06F 2212/261* (2013.01)

(58) Field of Classification Search
CPC ............. G06F 12/10; G06F 2212/261; G06F 2212/202; G06F 2212/2532
See application file for complete search history.

(56) References Cited

U.S. PATENT DOCUMENTS

| | | | | |
|---|---|---|---|---|
| 2008/0098195 A1* | 4/2008 | Cheon | ................. | G06F 12/0246 711/202 |
| 2009/0193184 A1* | 7/2009 | Yu | ...................... | G06F 12/0246 711/103 |
| 2010/0030997 A1* | 2/2010 | Gupta | ................. | G06F 12/1009 711/206 |
| 2010/0332732 A1* | 12/2010 | Chiang | ............... | G06F 12/0246 711/103 |
| 2012/0239862 A1* | 9/2012 | Seo | ..................... | G06F 12/0246 711/103 |
| 2012/0297117 A1* | 11/2012 | Jo | ....................... | G06F 12/0246 711/103 |
| 2013/0311746 A1* | 11/2013 | Raindel | ............... | G06F 12/0292 711/206 |
| 2014/0337560 A1* | 11/2014 | Chun | .................. | G06F 12/0246 711/103 |
| 2015/0347026 A1* | 12/2015 | Thomas | ................ | G06F 3/0611 711/103 |

FOREIGN PATENT DOCUMENTS

| | | |
|---|---|---|
| KR | 100701800 | 4/2007 |
| KR | 1020110117046 | 10/2011 |
| KR | 1020120105294 | 9/2012 |

OTHER PUBLICATIONS

Shinde Pratibha, Mrs. Suvarna, "Efficient Flash Translation layer for Flash Memory", International Journal of Scientific and Research Publications, Volumn 3, Issue 4, Apr. 2013.*

* cited by examiner

*Primary Examiner* — David X Yi
*Assistant Examiner* — Rocio Del Mar Perez-Velez
(74) *Attorney, Agent, or Firm* — IP & T Group LLP

(57) ABSTRACT

A controller controlling a non-volatile memory includes a first memory area suitable for storing a first address table, a second memory area suitable for storing a second address table, an address conversion block suitable for converting a sector address received from a host into a physical address corresponding to the non-volatile memory with reference to the first and second address tables, and one or more function blocks suitable for sharing the second memory area with the address conversion block. The address conversion block exclusively uses the first memory area.

17 Claims, 12 Drawing Sheets

CONTROLLER FOR CONTROLLING NON-VOLATILE MEMORY AND SEMICONDUCTOR DEVICE INCLUDING THE SAME

CROSS-REFERENCE TO RELATED APPLICATION

The present application claims priority to Korean Patent Application Number 10-2014-0067860, filed on Jun. 3, 2014, the entire disclosure of which is incorporated herein in its entirety by reference.

BACKGROUND

1. Field of Invention

Various exemplary embodiments of the present invention relate to an electronic device, and more particularly, to a controller for controlling a non-volatile memory and a semiconductor device including the same.

2. Description of Related Art

Semiconductor memory devices are memory devices formed of a semiconductor such as silicon (Si), germanium (Ge), gallium arsenide (GaAs), indium phosphide (InP), or the like. The semiconductor memory devices are largely classified as volatile memory devices and non-volatile memory devices.

A volatile memory device is a memory device in which stored data disappears when its power supply is cut off. Volatile memory devices include static random access memory (SRAM), dynamic RAM (DRAM), synchronous DRAM (SDRAM), and the like. A non-volatile memory device is a memory device in which the stored data is maintained even when its power supply is cut off. Non-volatile memory devices include read-only memory (ROM), programmable ROM (PROM), erasable programmable ROM (EPROM), electrically erasable programmable ROM (EEPROM), flash memory, phase-change RAM (PRAM), magnetoresistive RAM (MRAM), resistive RAM (RRAM), ferroelectric RAM (FRAM), or the like. Flash memory is largely classified as a NOR type or a NAND type.

SUMMARY

Various exemplary embodiments of the present invention are directed to a controller that increases operating speed of internal random access memory (RAM) that has reduced size.

One embodiment of the present invention provides a controller controlling a non-volatile memory, including a first memory area suitable for storing a first address table, a second memory area suitable for storing a second address table, an address conversion block suitable for accessing the first and second memory areas, and converting a sector address received from a host into a physical address corresponding to the non-volatile memory with reference to the first and second address tables, and one or more function blocks suitable for sharing the second memory area with the address conversion block, wherein the address conversion block exclusively uses the first memory area.

As an embodiment, the address conversion block may load address maps in units of small chunks from the non-volatile memory to the first memory area to generate the first address table, the small chunk including M number of sector addresses, and the address conversion block may load address maps in units of large chunks from the non-volatile memory to the second memory area to generate the second address table, the large chunk including N, which is greater than M, number of sector addresses.

As an embodiment, the address conversion block may determine a small chunk in which the sector address from the host is included, and search for the determined small chunk in the first address table.

As an embodiment, when there is the determined small chunk in the first address table, the address conversion block may convert the sector address received from the host into the physical address with reference to an address map of a searched small chunk, and when there is not the determined small chunk in the first address table, the address conversion block may determine a large chunk in which the sector address received from the host is included, and search for a determined large chunk in the second address table.

As an embodiment, the address conversion block may convert the sector address received from the host into the physical address with reference to an address map of a searched large chunk.

As an embodiment, when the sector address received from the host corresponds to hot data, the address conversion block may determine a small chunk in which the sector address received from the host is included, read an address map of a determined small chunk from the non-volatile memory, and update a read address map in the first address table.

As an embodiment, the address conversion block may determine the physical address with reference to an updated address map of the small chunk.

As an embodiment, when the sector address received from the host corresponds to cold data, the address conversion block may determine a large chunk in which the sector address received from the host is included, read an address map of a determined large chunk from the non-volatile memory, and update a read address map in the second address table.

As an embodiment, the address conversion block may determine the physical address with reference to an updated address map of the large chunk.

As an embodiment, in a garbage collection, the address conversion block may read sector addresses corresponding to a sacrificial block in the non-volatile memory, determine large chunks in which read sector addresses are included, and load address maps of determined large chunks to the second memory area.

As an embodiment, the address conversion block may determine whether each of pages of the sacrificial block is valid with reference to the loaded address maps.

As an embodiment, the controller may further include a garbage collection block suitable for reading data of valid pages in the sacrificial block, and writing read data to pages of a target block in the non-volatile memory.

As an embodiment, the first address table may include address maps divided in units of small chunks, each small chunk including M number of sector addresses, and the second address table may include address maps divided in units of large chunks, each large chunk including N, which is greater than M, number of sector addresses.

As an embodiment, each of the address maps of the first address table may include physical addresses mapped to the M sector addresses.

As an embodiment, each of the address maps of the second address table may include physical addresses mapped to the N sector addresses.

Another embodiment of the present invention provides a semiconductor device, including a non-volatile memory, and a controller suitable for controlling the non-volatile memory, wherein the controller includes a first memory area suitable for storing a first address table, a second memory area suitable for storing a second address table, an address conversion block suitable for accessing the first and second memory areas, and converting a sector address received from a host into a physical address corresponding to the non-volatile memory with reference to the first and second address tables, and one or more function blocks suitable for sharing the second memory area with the address conversion block, wherein the address conversion block exclusively uses the first memory area.

As an embodiment, the non-volatile memory may include a memory cell array suitable for storing address information, and the address conversion block may selectively load the address information, and generate the first and second address tables.

As an embodiment, the address conversion block may load address maps in units of small chunks from the address information to the first memory area and generate the first address table, the small chunk including M number of sector addresses, and the address conversion block may load address maps in units of large chunks from the address information to the second memory area and generate the second address table, the large chunk including N, which is greater than M, sector addresses.

A further embodiment of the present invention provides a semiconductor device, including a non-volatile memory including a memory cell array, and a controller suitable for controlling the non-volatile memory, wherein the controller comprises a first memory area suitable for storing a first address table including small chunks of first address maps, a second memory area suitable for storing a second address table including large chunks of second address maps, an address conversion block suitable for selectively loading address information of the memory cell array as the first and second address tables and converting a sector address received from a host into a physical address corresponding to the memory cell array with reference to the first and second address tables, and one or more function blocks suitable for sharing the second memory area with the address conversion block, but not sharing the first memory area with the address conversion block.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION

Hereinafter, exemplary embodiments of the present invention will be described with reference to accompanying drawings. In the following description, only a portion needed to understand an operation according to the present invention will be described, and known technology related to the present invention that can unnecessarily obscure the gist of the present invention will be omitted. Further, the present invention should not be construed as limited to exemplary embodiments set forth herein, and may be embodied in different forms. Exemplary embodiments of the present invention are described below in sufficient detail to enable those of ordinary skill in the art to embody and practice the present invention.

In this specification, a singular form may include a plural form as long as it is not specifically mentioned in a sentence. Furthermore, 'include/comprise' or 'including/comprising' used in the specification represents that one or more components, steps, operations, and elements exists or are added.

Figure 1:
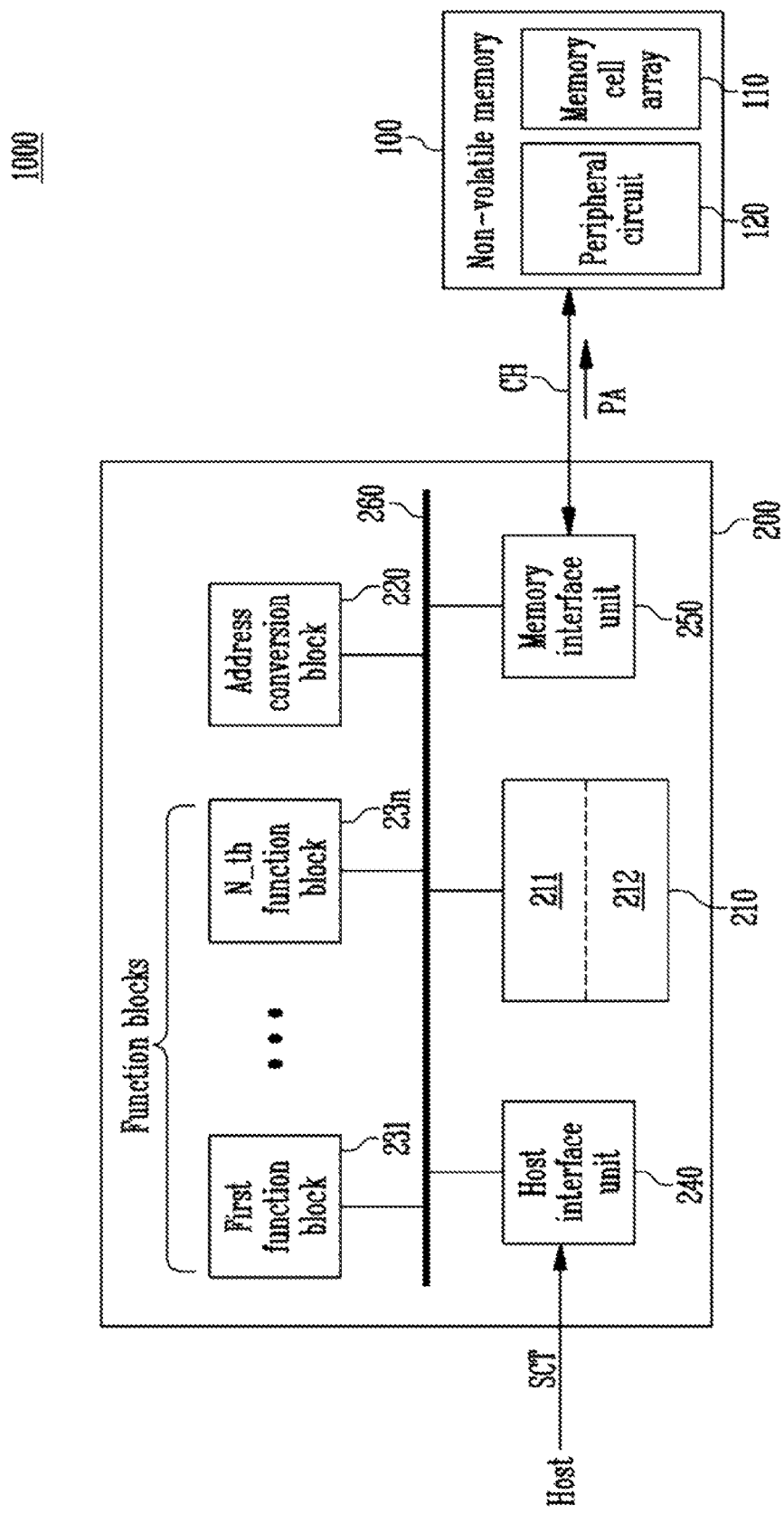
FIG. 1 is a block diagram illustrating a semiconductor device according to an exemplary embodiment of the present invention.
Figure 2:
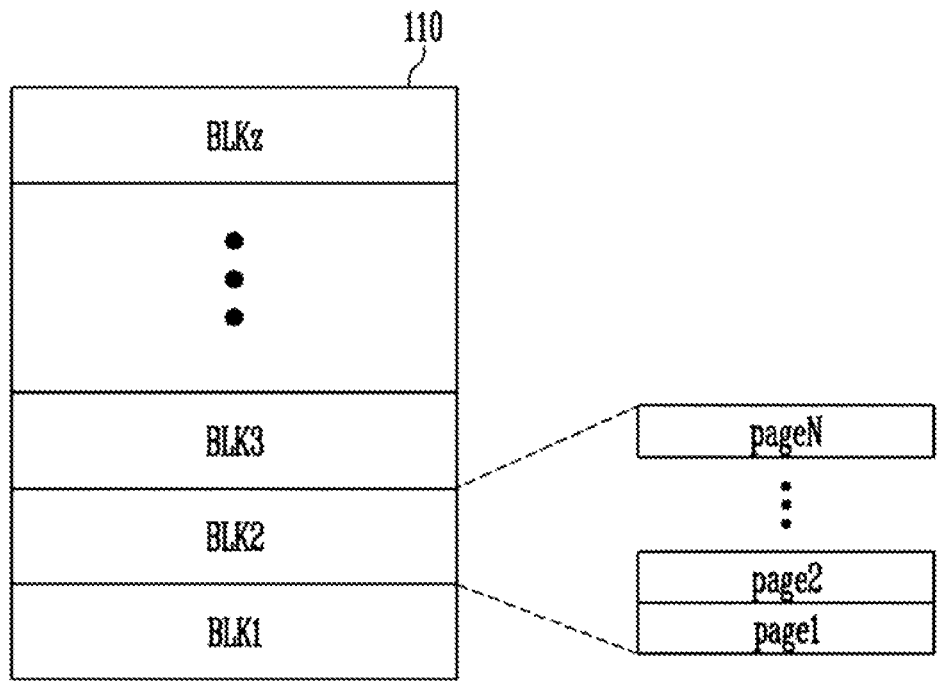
FIG. 2 is a diagram illustrating a memory cell array included in a non-volatile memory shown in FIG. 1.

FIG. 1 is a block diagram illustrating a semiconductor device 1000 according to an exemplary embodiment of the present invention. FIG. 2 is a diagram illustrating a memory cell array 110 included in a non-volatile memory 100.

Referring to FIG. 1, a semiconductor device 1000 may include the non-volatile memory 100 and a controller 200.

The non-volatile memory 100 may operate in response to the control of the controller 200. The non-volatile memory 100 may be connected to the controller 200 through one channel CH.

The non-volatile memory 100 may include a memory cell array 110, and a peripheral circuit 120 for driving the memory cell array 110. Referring to FIG. 2, the memory cell array 110 may include a plurality of memory blocks BLK1 to BLKz. Each of the plurality of memory blocks BLK1 to BLKz may include a plurality of pages page1 to pageN.

Referring to FIG. 1 again, the peripheral circuit 120 may be connected to the memory cell array 110. The peripheral circuit 120 may operate in response to the control of the controller 200. The peripheral circuit 120 may program data in the memory cell array 110, read the data from the memory cell array 110, and erase the data of the memory cell array 110, in response to the control of the controller 200.

As an embodiment, a read operation and a program operation of the non-volatile memory 100 may be performed in each page (page, see FIG. 2) as a basic unit. An erase operation of the non-volatile memory 100 may be performed in each memory block (BLK, see FIG. 2) as a basic unit.

In the program operation, the peripheral circuit 120 may receive write data and a physical address from the controller 200. A specific memory block BLK and a page may be designated by the physical address. The peripheral circuit 120 may program the write data in the page indicated by the physical address.

In the read operation, the physical address transmitted from the controller 200 to the peripheral circuit 120 may designate a specific memory block BLK and a page. The peripheral circuit 120 may read data from the page corresponding to the physical address, and output the read data to the controller 200.

In the erase operation, the physical address transmitted from the controller 200 to the peripheral circuit 120 may specify one memory block BLK. The peripheral circuit 120 may erase data of the memory block BLK corresponding to the physical address.

As an embodiment, the non-volatile memory 100 may be a flash memory.

Address information may be stored in the memory cell array 110. The address information may be information for mapping between a sector address SCT received from a host and the physical address provided to the non-volatile memory 100. The address information may be generated by an address conversion block 220 and stored in the memory cell array 110.

As an embodiment, the address information may be stored in at least one memory block (for example, BLK1) among the memory blocks BLK1 to BLKz of the memory cell array 110. The address information may be loaded in a random access memory (RAM) 210 and used by the address conversion block 220, inside the controller 200.

The controller 200 may be connected between the host and the non-volatile memory 100. The controller 200 may provide an interface between the host and the non-volatile memory 100.

The controller 200 may access the non-volatile memory 100 in response to a request of the host. For example, the controller 200 may control read, write, erase, and background operations of the non-volatile memory 100. The controller 200 may provide the interface between the non-volatile memory 100 and the host. The controller 200 may drive firmware for controlling the non-volatile memory 100.

The controller 200 may include the RAM 210, the address conversion block 220, first to n-th function blocks 231 to 23n, a host interface unit 240, and a memory interface unit 250.

The RAM 210 may be connected to a bus 260. The address conversion block 220 and the first to n-th function blocks 231 to 23n may use a storage space of the RAM 210 for various purposes. For example, the RAM 210 may be used as an operating memory of the address conversion block 220 and the first to n-th function blocks 231 to 23n. For example, the RAM 210 may be used as a buffer memory between the host and the non-volatile memory 100.

As an embodiment, the RAM 210 may be configured as a SRAM, a DRAM, a SDRAM, etc.

According to an embodiment of the present invention, the RAM 210 may include a first memory area 211 and a second memory area 212. The first memory area 211 may be exclusively used by the address conversion block 220. The second memory area 212 may be shared by the address conversion block 220 and the first to n-th function blocks 231 to 23n.

The address conversion block 220 may be configured to convert the sector address SCT received from the host into the physical address provided to the non-volatile memory 100. The address conversion block 220 may be connected to the RAM 210 through the bus 260.

The address conversion block 220 may use the first and second memory areas 211 and 212. The address conversion block 220 may read the address information from the non-volatile memory 100, and store a first address table in the first memory area 211. The address conversion block 220 may read the address information from the non-volatile memory 100, and store a second address table in the second memory area 212. After this, the address conversion block 220 may convert the sector address SCT into the physical address with reference to the first and second address tables.

As an embodiment, the address conversion block 220 may operate as a flash translation layer (FTL).

The first to n-th function blocks 231 to 23n may be connected to the bus 260. Each of the first to n-th function blocks 231 to 23n may perform a specific function. Each of the first to n-th function blocks 231 to 23n may use the second memory area 212 for performing a corresponding function. Each of the first to n-th function blocks 231 to 23n may access the second memory area 212 of the RAM 210 through the bus 260. For example, each of the first to n-th function blocks 231 to 23n may include a direct memory access (DMA) function, and write and read data to/from the second memory area 212 using the DMA function.

For example, any one among the first to n-th function blocks 231 to 23n may operate as a protocol control block for controlling the host interface unit 240. The protocol control block may control the host interface unit 240 to process and convert a response received from the host into a protocol corresponding to the host and output the converted protocol.

For example, any one of the first to n-th function blocks 231 to 23n may operate as the DMA block. The DMA block may write data to the second memory area 212, and read the data from the second memory area 212. For example, when receiving a write request from the host, the DMA block may temporarily store the write data in the second memory area 212 during the write request. During the write request, a sector address SCT may be provided to the address conversion block 220. The temporarily stored write data in the second memory area 212 may be outputted to the non-volatile memory 100 through the memory interface unit 250. For example, the DMA block may temporarily store read data read from the non-volatile memory 100 in the second memory area 212 based on a read request from the host. After this, the temporarily stored read data may be outputted to the host through the host interface unit 240.

For example, any one among the first to n-th function blocks 231 to 23n may be a function block for performing a garbage collection operation. The function block for performing the garbage collection operation may read data of sacrificial blocks among the memory blocks BLK1 to BLKz (see FIG. 2) of the memory cell array 110, and temporarily store the read data in the second memory area 212. After this, the function block for performing the garbage collection operation may write the temporarily stored data to a target block among the memory blocks BLK1 to BLKz. The function block for performing the garbage collection operation may erase data of the sacrificial blocks.

For example, any one among the first to n-th function blocks 231 to 23n may operate as an error correcting block. The error correcting block may detect an error of data read from the non-volatile memory 100 using an error correcting code (ECC), and correct the detected error. The second memory area 212 may be used as a storage space required for correcting the error.

For example, any one among the first to n-th function blocks 231 to 23n may perform an operation for controlling various operations of the address conversion block 220 and the first to n-th function blocks 231 to 23n.

In addition, it will be understood that the first to n-th function blocks 231 to 23n may perform various operations using the second memory area 212.

The host interface unit 240 may be connected to the host. The host interface unit 240 may include a protocol for performing data exchange between the host and the controller 200. As an embodiment, the controller 200 may communicate with the host through at least one among various interface protocols such as a universal serial bus (USB) protocol, a multi-media card (MMC) protocol, a peripheral component interconnect (PCI) protocol, a peripheral component interconnect-express (PCI-E) protocol, an advanced technology attachment (ATA) protocol, a serial ATA (SATA) protocol, a parallel ATA (PATA) protocol, a small computer system interface (SCSI) protocol, an enhanced small device interface (ESDI) protocol, an integrated drive electronics (IDE) protocol, a private protocol, and so on.

The memory interface unit 250 may interface with the non-volatile memory 100. The memory interface unit 250 may output data to the non-volatile memory 100 and receive data read from the non-volatile memory 100, in response to the control of the address conversion block 220 and the first to n-th function blocks 231 to 23n.

For example, the memory interface unit 250 may be a NAND interface unit or a NOR interface unit.

The second memory area 212 may be accessed by the first to n-th function blocks 231 to 23n. Further, as described above, the second address table may be stored in the second memory area 212 by the address conversion block 220.

If any one of the first to n-th function blocks 231 to 23n accesses the second memory area 212 in which the second address table is stored, all or a part of the second address table may be damaged. On the other hand, the first memory area 211 may be exclusively used by the address conversion block 220. Accordingly, for example, the first address table may be maintained unless sudden power-off occurs.

Suppose that the whole RAM 210 is shared by the first to n-th function blocks 231 to 23n and the address conversion block 220, and the address table is stored in a sharing area. When the first to n-th function blocks 231 to 23n use the sharing area, all or a part of the address table may be erased. That is, important address information included in the address table may be erased. After this, when the sector address SCT corresponding to the erased address information is received from the host, the address conversion block 220 may load again the erased address information from the non-volatile memory 100 to the RAM 210. In this case, the controller 200 may not quickly process a request of the host.

Suppose that the address table to be loaded for driving the address conversion block 220 is stored in the first memory area 211 only. In order to store the address table, the storage space of first memory area 211 may be increased. In this case, the storage space required for the whole RAM 210 may consequently be increased, and the manufacturing cost of the controller 200 may be increased.

According to an embodiment of the present invention, the RAM 210 may be divided into the first memory area 211 which is exclusively used by the address conversion block 220 and the second memory area 212 which is shared by the address conversion block 220 and the first to n-th function blocks 231 to 23n. The address conversion block 220 may store two address tables in the first memory area 211 and the second memory area 212, respectively. The address table having a relatively high importance may be stored in the first memory area 211, and the address table having a relatively low importance may be stored in the second memory area 212. Accordingly, the operating speed of the controller 200 may be increased, and the size of the storage space required for the RAM 210 may be decreased.

Figure 3:
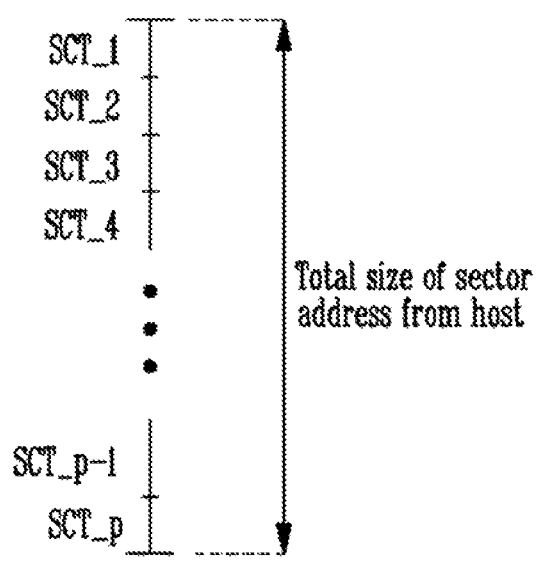
FIG. 3 is a conceptual diagram illustrating sector addresses provided from a host.

FIG. 3 is a conceptual diagram illustrating sector addresses SCT_1 to SCT_p provided from a host.

Referring to FIG. 3, first to p-th sector addresses SCT_1 to SCT_p may be received from the host.

For example, the host may transfer information on a start sector address (for example, SCT_1) and the number of sector addresses (for example, 4) to the controller 200. Accordingly, the sector addresses (for example, SCT_1 to SCT_4) transferred from the host may be specified. According to the method, the host may transfer the first to p-th sector addresses SCT_1 to SCT_p to the controller 200.

As an embodiment, when there is a write request from the host to the controller 200, the write request may include the sector address SCT and write data. When there is a read request from the host to the controller 200, the read request may include the sector address SCT. When there is an erase request from the host to the controller 200, the erase request may include the sector address SCT.

Figure 4:
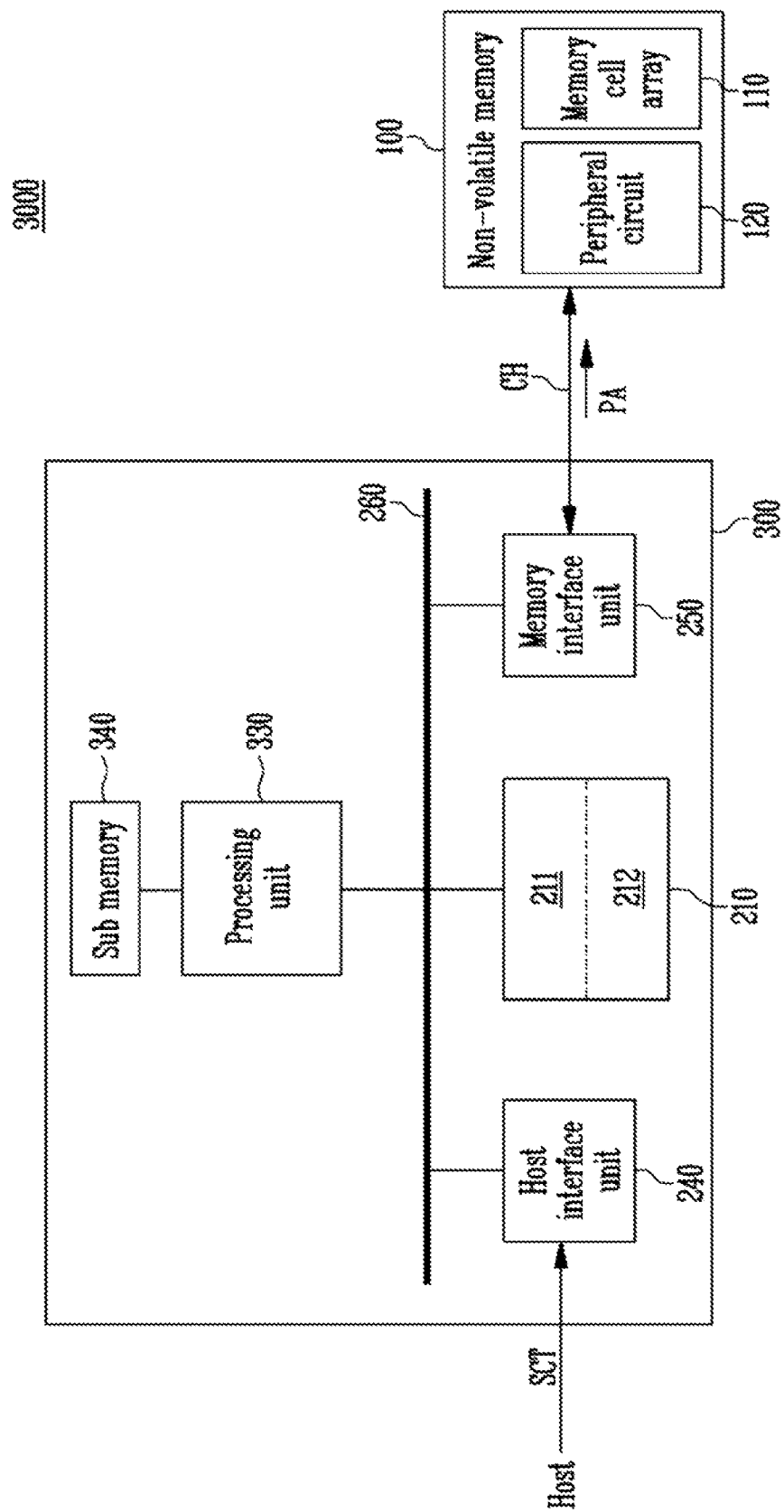
FIG. 4 is a block diagram illustrating one embodiment of the semiconductor device of FIG. 1.

FIG. 4 is a block diagram Illustrating one embodiment 3000 of the semiconductor device 1000 of FIG. 1.

Referring to FIG. 4, the semiconductor device 3000 may include a non-volatile memory 100 and a controller 300.

The controller 300 may include a RAM 210, a host interface unit 240, a memory interface unit 250, a processing unit 330, and a sub memory 340.

The RAM 210, the host interface unit 240, and the memory interface unit 250 may have the same construction and operation as the RAM 210, the host interface unit 240, and the memory interface unit 250 described with reference to FIG. 1. Hereinafter, a duplicate description will be omitted.

The processing unit 330 may be connected to the bus 260. Program codes corresponding to each of the first to n-th function blocks 231 to 23n and the address conversion block 220 may be stored in the sub memory 340. The processing unit 330 may execute the program codes stored in the sub memory 340, and perform functions of the first to n-th function blocks 231 to 23n and the address conversion block 220 of FIG. 1.

As one embodiment, the sub memory 340 may be located outside the processing unit 330, and provide the program codes for the processing unit 330. As another embodiment, the sub memory 340 may be provided inside the processing unit 330.

As an embodiment, the sub memory 340 may be configured as a SRAM, a DRAM, a SDRAM, a ROM, a PROM, an EPROM, an EEPROM, etc.

Figure 5:
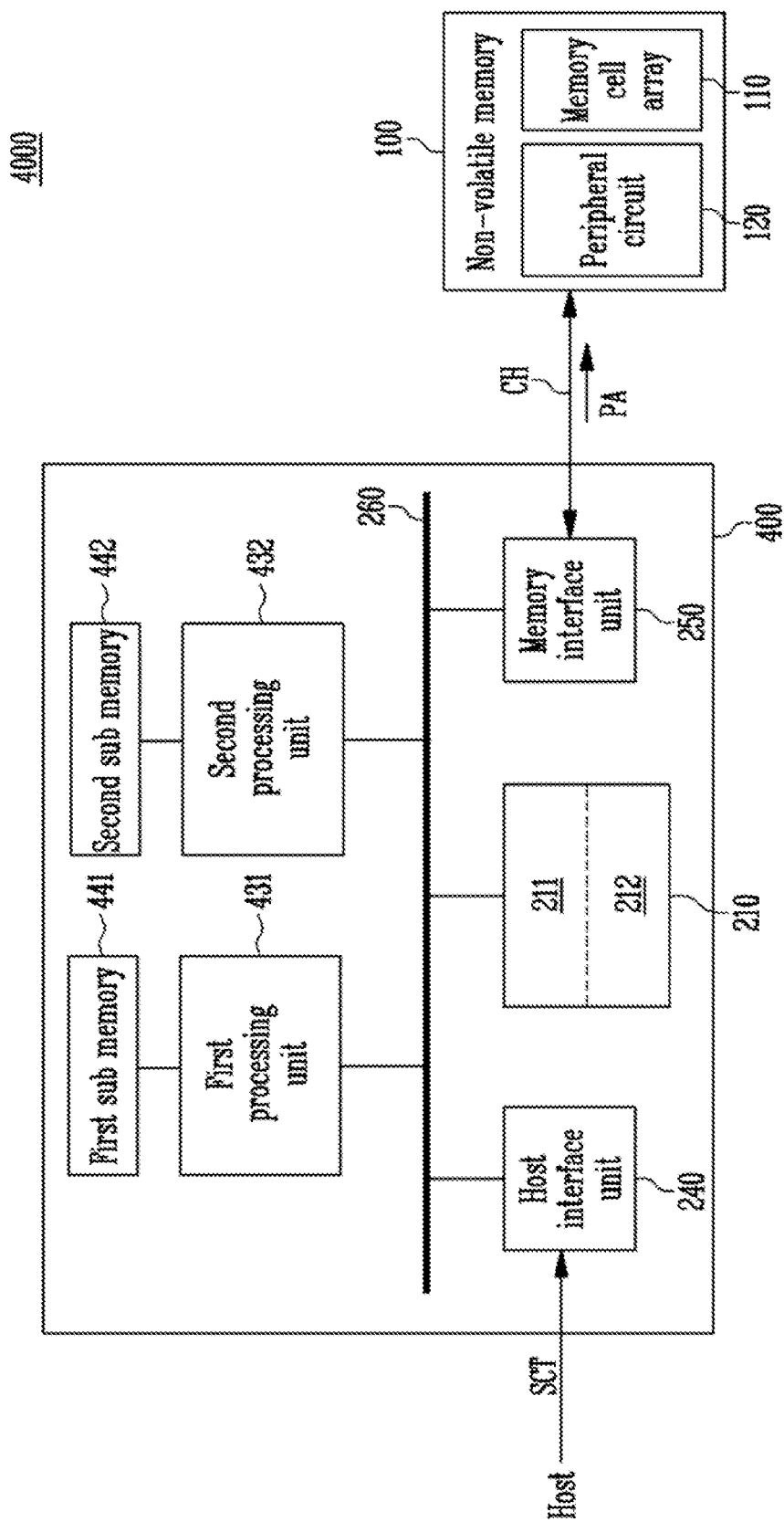
FIG. 5 is a block diagram illustrating another embodiment of the semiconductor device of FIG. 1.

FIG. 5 is a block diagram illustrating another embodiment 4000 of the semiconductor device 1000 of FIG. 1.

Referring to FIG. 5, the semiconductor device 4000 may include a non-volatile memory 100 and a controller 400.

The controller 400 may include a RAM 210, a host interface unit 240, a memory interface unit 250, first and second processing units 431 and 432, and first and second sub memories 441 and 442.

The RAM 210, the host interface unit 240, and the memory interface unit 250 may have the same construction and operation as the RAM 210, the host interface unit 240, and the memory interface unit 250 described with reference to FIG. 1. Hereinafter, a duplicated description will be omitted.

The controller 400 may include two or more processing units 431 and 432. The processing units 431 and 432 may be connected to the first and second sub memories 441 and 442, respectively. The first and second processing units 431 and 432 may divide and perform the functions of the first to n-th function blocks 231 to 23*n* and the address conversion block 220. Each of the processing units 431 and 432 may execute the program codes stored in a corresponding sub memory, and perform at least one function of the first to n-th function blocks 231 to 23*n* and the address conversion block 220.

When the controller 400 includes the two or more processing units 431 and 432, the operating speed of the semiconductor device 4000 may be increased.

In addition, the first to n-th function blocks 231 to 23*n* and the address conversion block 220 may be implemented in various methods. As an embodiment, each of the first to n-th function blocks 231 to 23*n* and the address conversion block 220 may be implemented by hardware, a program code, or the combination of the hardware and the program code.

For example, the program code may include a high-level language code generated using an interpreter, etc. as well as a machine code generated by a compiler.

Hereinafter, for a simple description, an embodiment of the present invention will be described based on the embodiment of FIG. 1.

Figure 6:
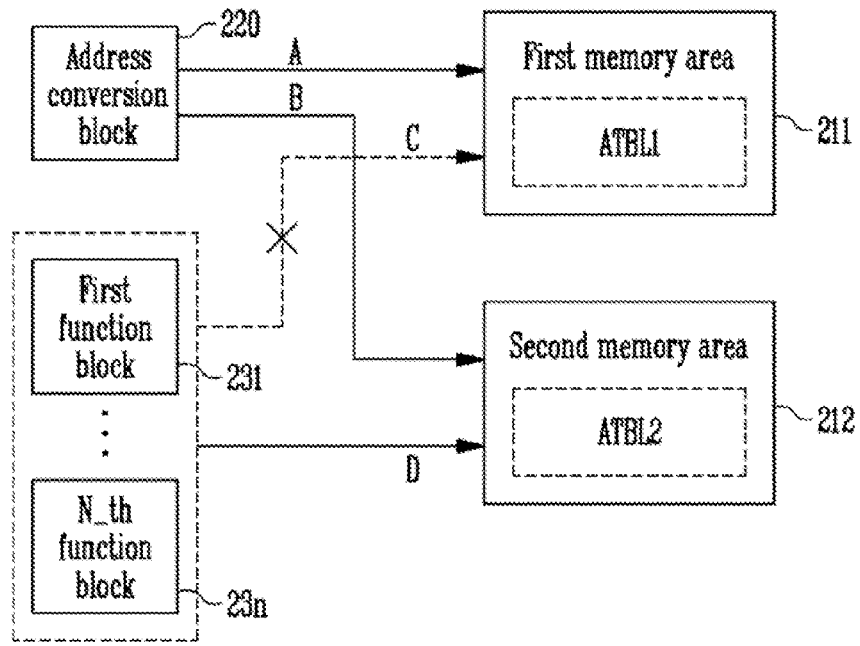
FIG. 6 is a conceptual diagram for describing a method using first and second memory areas shown in FIG. 1 according to an embodiment of the present invention.

FIG. 6 is a conceptual diagram for describing a method using first and second memory areas 211 and 212 according to an embodiment of the present invention.

Referring to FIGS. 1 and 6, the address conversion block 220 may access the first and second memory areas 211 and 212. The address conversion block 220 may read address information from the non-volatile memory 100, and store the read address information in the first memory area 211 as a first address table ATBL1 (A). The address conversion block 220 may store the address information read from the non-volatile memory 100 in the second memory area 212 as a second address table ATBL2 (B). That is, the address conversion block 220 may use the first and second memory areas 211 and 212 for storing the address information.

The first to n-th function blocks 231 to 23*n* may not access the first memory area 211 (C). The first to n-th function blocks 231 to 23*n* may access the second memory area 212 (D). When the first to n-th function blocks 231 to 23*n* access the second memory area 212, all or a part of the address table ATBL2 may be erased.

On the other hand, since the first to n-th function blocks 231 to 23*n* cannot access the first memory area 211, the first address table ATBL1 may be preserved.

As an embodiment, each of the first and second address tables ATBL1 and ATBL2 may be managed by grouping the address information of successive sector addresses. Accordingly, address information of a target address may be effectively searched for in the first and second address tables ATBL1 and ATBL2.

According to an embodiment of the present invention, the number of successive sector addresses grouped in the first and second address tables ATBL1 and ATBL2 may be different from each other. This is described below in more detail.

Figure 7:
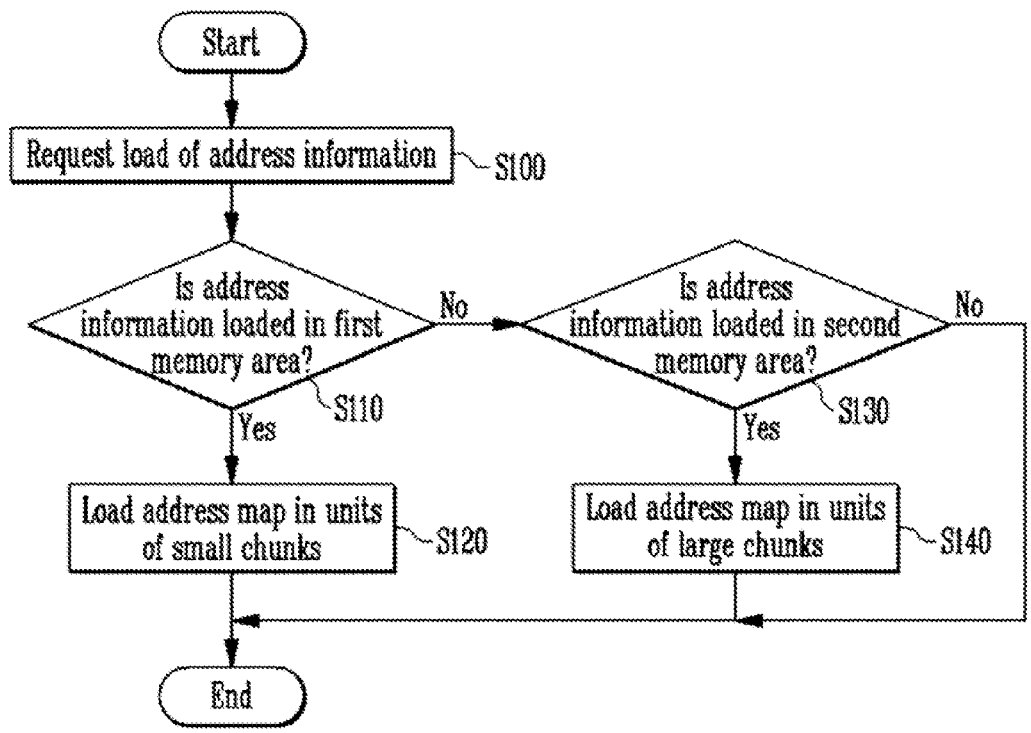
FIG. 7 is a flowchart for describing an operation method of an address conversion block shown in FIG. 1.

FIG. 7 is a flowchart for describing an operation method of an address conversion block 220.

Referring to FIGS. 1 and 7, load of address information is requested (operation S100).

For example, when there is no address information corresponding to a sector address from the host in the first and second address tables ATBL1 and ATBL2 (see FIG. 6), the address conversion block 220 may load corresponding address information from the non-volatile memory 100.

For example, when the semiconductor device 1000 is initialized after power-up, the address conversion block 220 may load the address information from the non-volatile memory 100. For example, the address conversion block 220 may load the address information from the non-volatile memory 100 when the semiconductor device 1000 enters from a sleep mode to an active mode. For example, the address conversion block 220 may load the address information from the non-volatile memory 100 each predetermined period.

In addition, it will be understood that the load of the address information is requested in various conditions.

When address information is loaded in the first memory area 211 (operation S110), the address conversion block 220 may load an address map in units of small chunks. Here, the small chunk may mean a group of A sector addresses (A may be an integer which is greater than 0). The address map of the small chunk may be address information between A sector addresses and corresponding physical addresses.

When address information is loaded in the second memory area 212 (operation S130), the address conversion block 220 may load an address map in units of large chunks. A large chunk may mean a group of B sector addresses (B may be an integer which is greater than 0). Here, B may be greater than A. The address map of the large chunk may be address information between B (greater than A) sector addresses and corresponding physical addresses.

Figure 8:
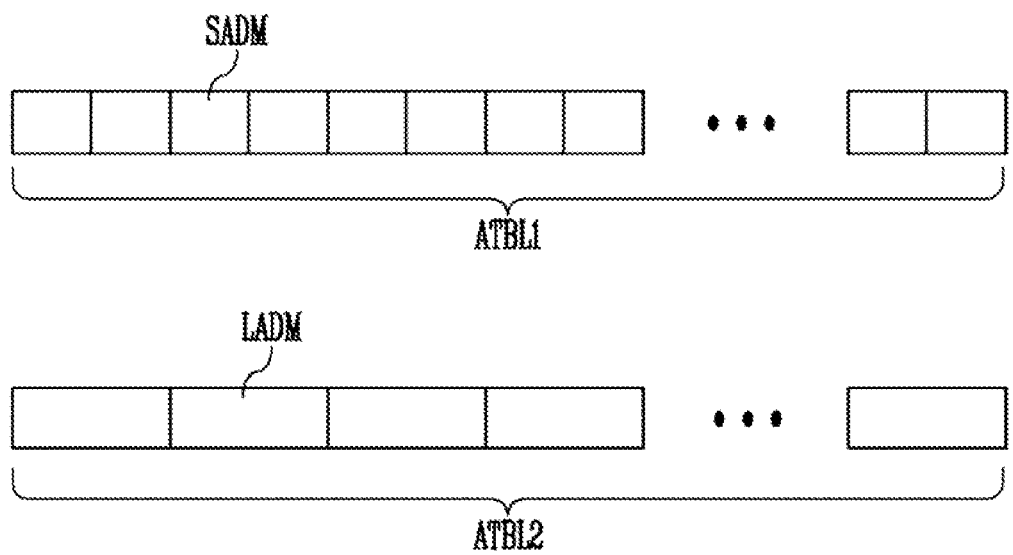
FIG. 8 is a conceptual diagram illustrating first and second address tables configured according to the embodiment of FIG. 7.

FIG. 8 is a conceptual diagram Illustrating first and second address tables ATBL1 and ATBL2 configured according to the embodiment of FIG. 7.

Referring to FIG. 8, the first address table ATBL1 may include address maps of small chunks. The address map SADM of each of the small chunks may include physical address mapped to A successive sector addresses.

The second address table ATBL2 may include address maps of large chunks. The address map LADM of each of the large chunks may include physical addresses mapped to B (greater than A) successive sector addresses.

The size of the chunk of the address map SADM (that is, a size of the small chunk) may be smaller than that of the address map LADM (that is, the size of the large chunk).

Figure 9:
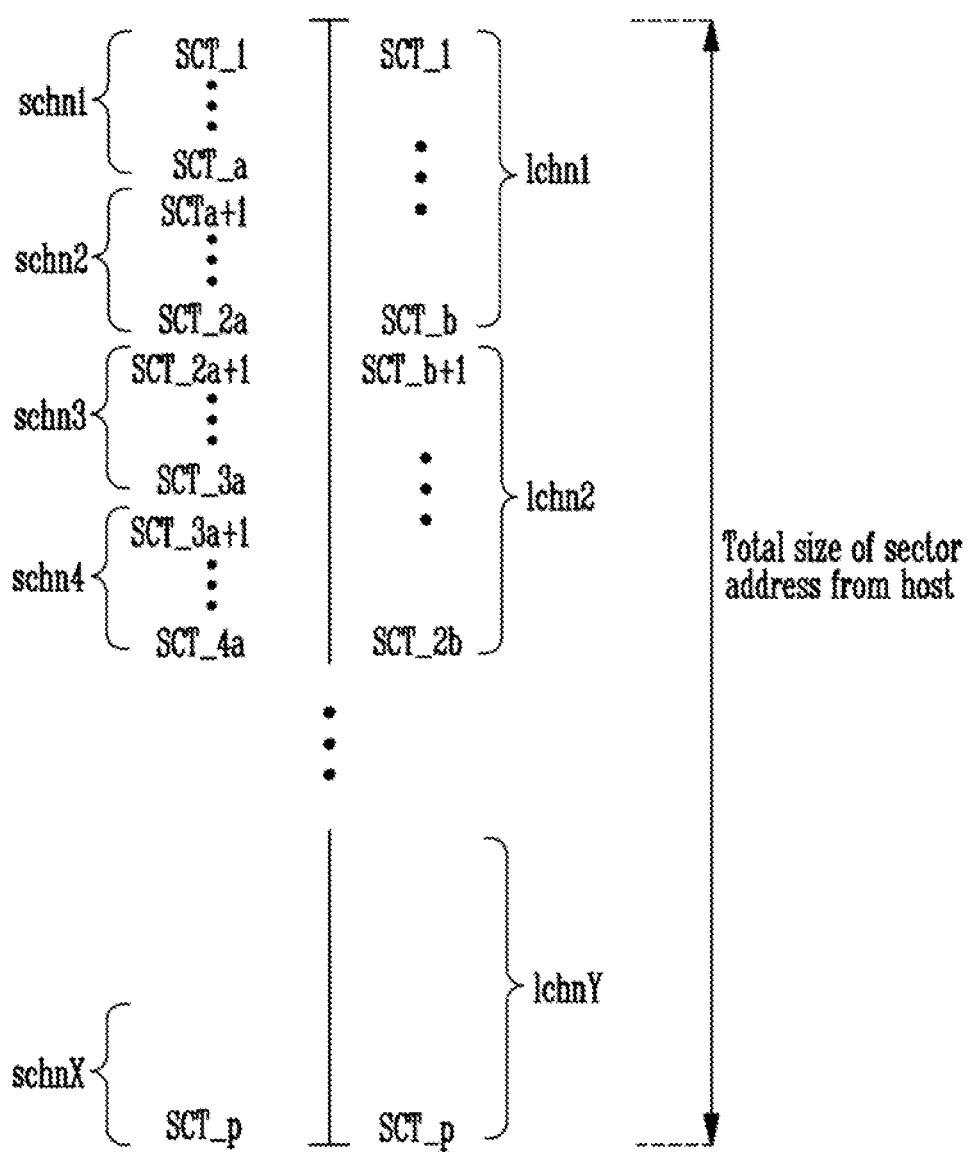
FIG. 9 is a conceptual diagram for describing small chunks and large chunks.

FIG. 9 is a conceptual diagram for describing a small chunk and a large chunk.

Referring to FIG. 9, sector addresses SCT_1 to SCT_p received from the host (see FIG. 1) may be divided in units of A successive sector addresses. Accordingly, the sector addresses SCT_1 to SCT_p may be divided into first to X small chunks schn1 to schnX.

Each of the small chunks schn1 to schnX may include A successive sector addresses. The first small chunk schn1 may include first to A_th sector addresses SCT_1 to SCT_a. The second small chunk schn2 may include A+1_th to 2A_th sector addresses SCT_a+1 to SCT_2a. The third small chunk schn3 may include 2A+1_th to 3A_th sector addresses SCT_2a+1 to SCT_3a. The fourth small chunk schn4 may include 3A+1_th to 4A_th sector addresses SCT_3a+1 to SCT_4a. The X small chunk schnX may include P-A+1_th to P_th sector addresses SCT_p-a+1 to SCT_p.

On the other hand, the sector addresses SCT_1 to SCT_p may be divided in units of B (greater than A) successive sector addresses. Accordingly, the sector addresses SCT_1 to SCT_p may be divided into first to Y large chunks lchn1 to lchnY.

Each of the large chunks lchn1 to lchnY may include B successive sector addresses. Here, B may be greater than A. The first large chunk lchn1 may include first to B_th sector addresses SCT_1 to SCT_b. The second large chunk lchn2 may include B+1_th to 2B_th sector addresses SCT_b+1 to SCT_2b. The Y large chunk lchnY may include P−B+1_th to P_th sector addresses SCT_p−b+1 to SCT_p.

Figure 10:
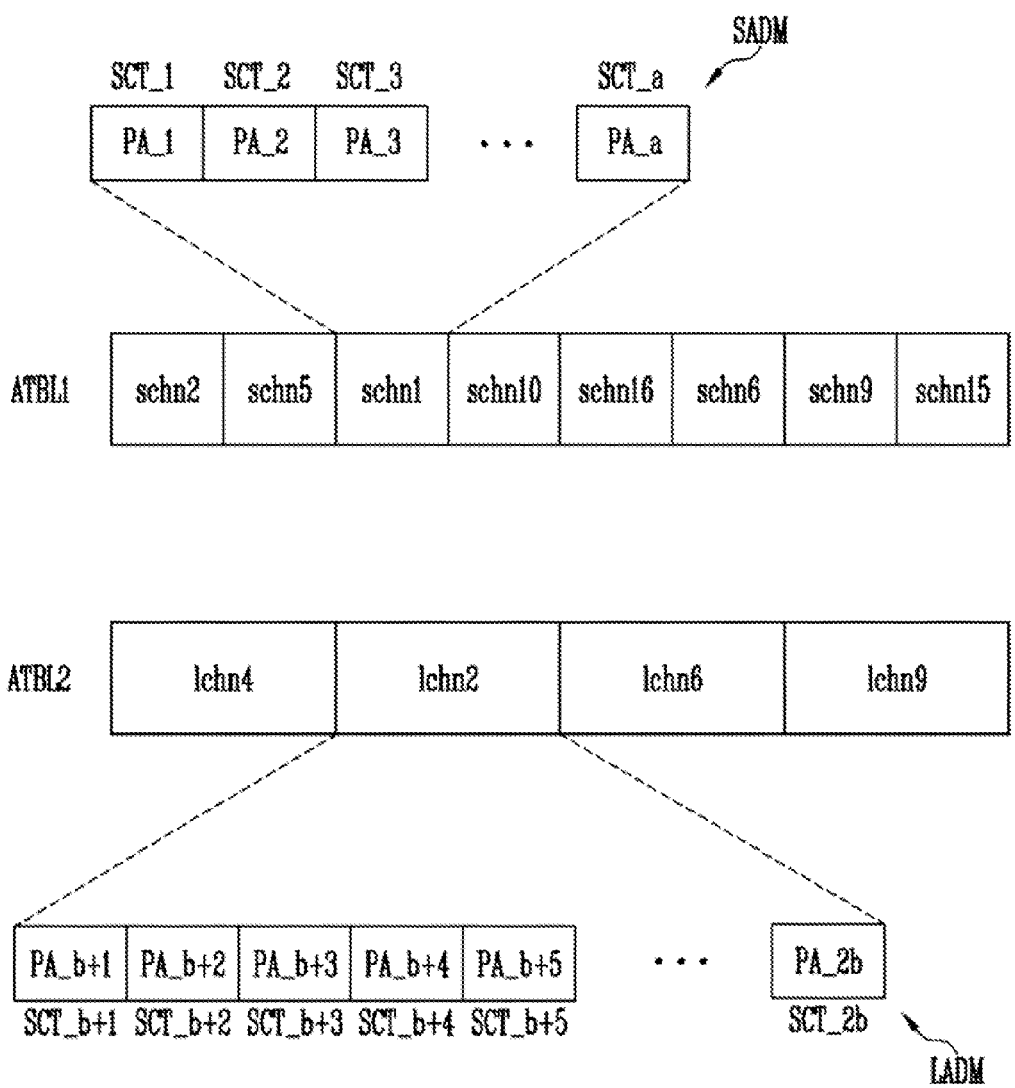
FIG. 10 is a conceptual diagram illustrating an example of the first and second address tables of FIG. 8.

FIG. 10 is a conceptual diagram illustrating an example of the first and second address tables ATBL1 and ATBL2 of FIG. 8. In FIG. 10, for a simple description, an address map included in each of the first and second address tables may be represented as the corresponding chunk number.

Referring to FIG. 10, the first address table ATBL1 may include address maps of second, fifth, first, tenth, sixteenth, sixth, ninth, fifteenth small chunks schn2, schn5, schn1, schn10, schn16, schn6, schn9, and schn15.

The address map SADM of each of the small chunks may include physical addresses corresponding to A sector addresses. For example, as shown in FIG. 10, the address map of the first small chunk schn1 may include physical addresses PA_1 to PA_a corresponding to the first to A_th sector addresses SCT_1 to SCT_a. As an embodiment, the address map of each of the small chunks may be implemented by a bit map method in which the physical address is mapped based on the sector address number.

As an embodiment, the first address table ATBL1 may be managed by a least recently used (LRU) method. According to the LRU method, an address map of a new small chunk may be updated in the first address table ATBL1. According to the LRU method, the address maps of the small chunks schn2, schn5, schn1, schn10, schn16, schn6, schn9, and schn15 may be excluded from the first address table ATBL1.

The second address table ATBL2 may include address maps of fourth, second, sixth, and ninth large chunks lchn4, lchn2, lchn6, and lchn9.

The address map LADM of each of the large chunks may include physical addresses corresponding to B sector addresses. For example, as shown in FIG. 10, the address map of the second large chunk lchn2 may include physical addresses PA_b+1 to PA_2b corresponding to B+1_th to 2B_th sector addresses SCT_b+1 to SCT_2b. As an embodiment, the address map of each of the large chunks may be implemented by a bit map method in which the physical address is mapped based on the sector address number.

As an embodiment, the second address table ATBL2 may be managed by the least recently used (LRU) method.

Referring to FIGS. 1 and 8 again, when the sector address SCT is received from the host, the address conversion block 220 may determine whether there is address information corresponding to the sector address SCT in the first and second address tables ATBL1 and ATBL2.

The address conversion block 220 may search the first address table ATBL1, and then, the second address table ATBL2 for the address information. In order to search the first address table ATBL1, the address conversion block 220 may determine a small chunk in which the sector address SCT is included. For example, when a sixty-fourth sector address is received, the address conversion block 220 may determine the small chunk including the sixty-fourth sector address by dividing 64 by the number of the sector addresses which the small chunk includes. Further, the address conversion block 220 may search for the determined small chunk in the first address table ATBL1. When there is the determined small chunk in the first address table ATBL1, the address conversion block 220 may determine the physical address corresponding to the sector address SCT with reference to the address map of the searched small chunk. For example, the address conversion block 220 may search for the sixty-fourth sector address in the address map of the searched small chunk, and determine the physical address corresponding to the searched sixty-fourth sector address.

When there is no address information of the small chunk including the sector address SCT in the first address table ATBL1, the address conversion block 220 may determine a large chunk in which the sector address SCT is included. The address conversion block 220 may determine a large chunk corresponding to the sector address SCT in the second address table ATBL2. For example, when the sixty-fourth sector address is received, the address conversion block 220 may determine the large chunk including the sixty-fourth sector address by dividing 64 by the number of the sector addresses which the large chunk includes.

After this, the address conversion block 220 may search for the determined large chunk in the second address table ATBL2.

Suppose that there is no address information including the sector address SCT in the first and second address tables ATBL1 and ATBL2. The address conversion block 220 may load the address information of the sector address SCT to the first memory area 211 or the second memory area 212.

The address information of the sector address SCT may be loaded to the first memory area 211. The address conversion block 220 may determine the small chunk including the sector address SCT, read the address map SADM of the determined small chunk from the non-volatile memory 100, and update the read address map SADM of the small chunk in the first address table ATBL1. Further, the address conversion block 220 may convert the sector address SCT to the physical address with reference to the updated address map SADM of the small chunk.

The address information of the sector address SCT may be loaded to the second memory area 212. The address conversion block 220 may determine the large chunk including the sector address SCT, and update the address map LADM of the determined large chunk in the second address table ATBL2. Further, the address conversion block 220 may convert the sector address SCT to the physical address with reference to the updated address map LADM of the large chunk.

As the address table is managed in units of chunks, the address information of a target sector address may be effectively searched for in the address table. When a chunk including the target sector address is determined, the address conversion block 220 may search for the determined chunk in the address table, and acquire the address information by searching for the sector address in the searched chunk.

However, as the size of the chunk is increased, a proportion of the address information regarding the sector address which is not received from the host may be increased in the address table. On the other hand, as the size of the chunk is decreased, a proportion of the address information regarding the sector address received from the host may be increased. As the size of the chunk is decreased, integrity of the address information may be increased.

According to an embodiment of the present invention, the address map SADM is stored in units of small chunks in the first memory area 211 that the address conversion block 220 exclusively uses, thereby increasing the integrity of the address information corresponding to the address map SADM in the first memory area 211. Increasing the integrity may mean that the probability that there is the sector address SCT received from the host is increased. Operating performance of the controller 200 may be improved by maintaining the address information with high integrity in the first memory area 211 which the address conversion block 220 exclusively uses.

As the size of the chunk is decreased, the number of chunks in the address table may be increased. Accordingly, the cost for managing corresponding address tables may be increased. For example, the time used for searching for the chunk including the sector address SCT received from the host in the address table, information with respect to a location in which each of the chunks is stored in the RAM 210, and information for managing each of the chunks by the LRU method may be increased.

According to an embodiment of the present invention, the address map LADM may be stored in units of large chunks in the second memory area 212 shared by the address conversion block 220 and the function blocks 231 to 23n. Accordingly, the second memory area 212 having a high probability to be erased may decrease cost for managing the address information thereof.

Figure 11:
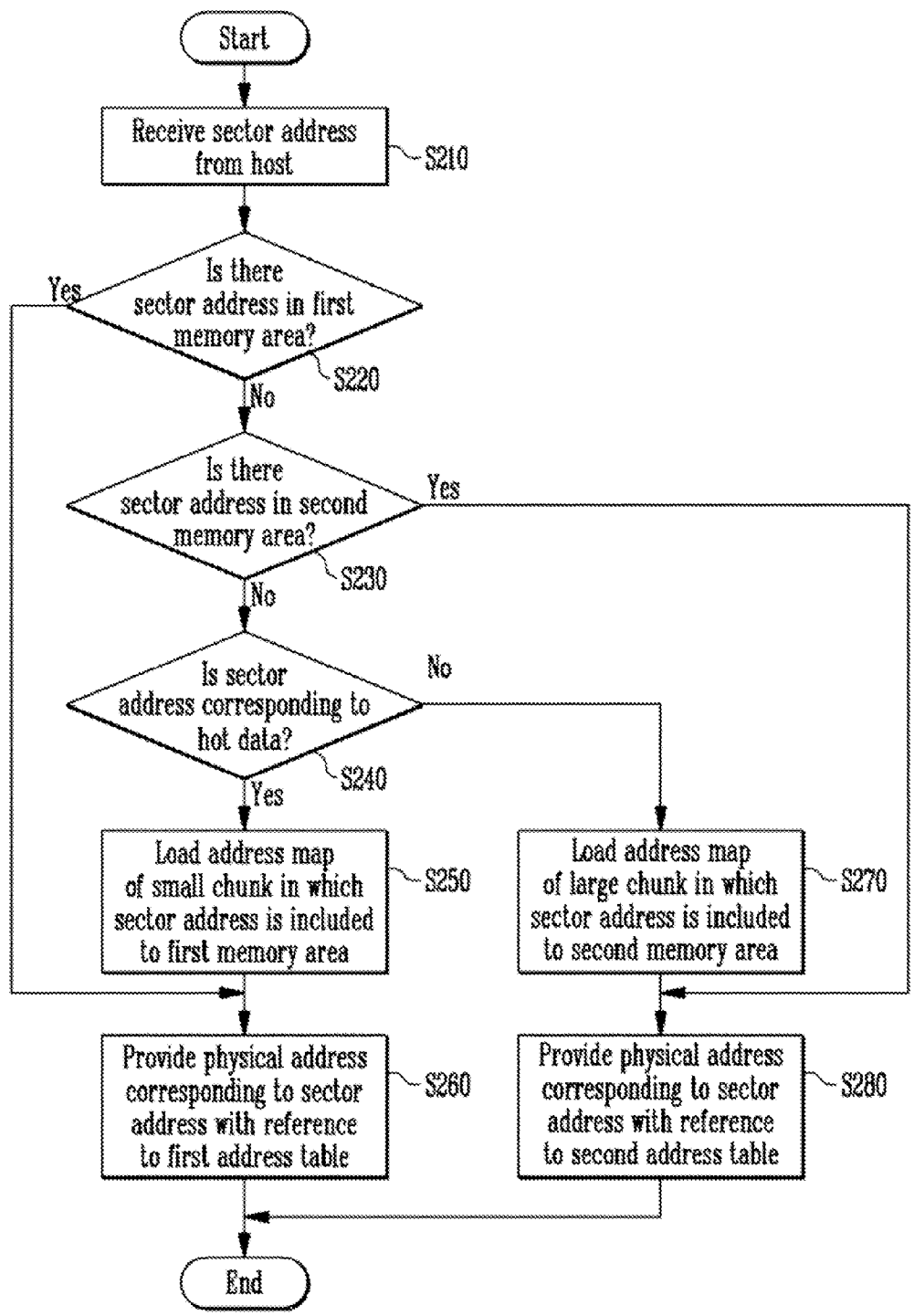
FIG. 11 is a flowchart for describing one application example of the operation method of the address conversion block shown in FIG. 1.

FIG. 11 is a flowchart for describing one application example of the operation method of the address conversion block 220.

Referring to FIGS. 1 and 11, in operation S210, the sector address SCT may be received from the host. In operation S220, the address conversion block 220 may determine whether there is the sector address SCT in the first memory area 211. The address conversion block 220 may determine whether there is the small chunk including the sector address SCT among the small chunks of the first address table ATBL1. If so, operation S260 may be performed. If not, operation S230 may be performed.

In operation S230, the address conversion block 220 may determine whether there is the sector address SCT in the second memory area 212. The address conversion block 220 may determine whether there is the large chunk including the sector address SCT among the large chunks of the second address table ATBL2. If so, operation S280 may be performed. If not, operation S240 may be performed.

After this, the address conversion block 220 may determine the type of the sector address SCT. As operation S240 of FIG. 11, the address conversion block 220 may determine whether the sector address SCT corresponds to hot data. The hot data may mean a sector address which is frequently received from the host. Cold data may mean a sector address excluding the hot data.

It will be understood that determining the type of the sector address SCT is performed by various methods. For example, a queue with a specific size is provided, and the sector address SCT is inputted to the queue whenever the sector address SCT is received from the host. It may be determined that the sector address stored in the queue is the hot data. It may be determined that the sector address which is not stored in the queue is the cold data. In addition, the type of the sector address SCT may be determined by various methods. When the sector address SCT is the hot data, operation S250 is performed. When the sector address SCT is the cold data, operation S270 may be performed.

In operation S250, the address conversion block 220 may load the address map of the small chunk in which the sector address SCT is included from the non-volatile memory 100 to the first memory area 211. The address conversion block 220 may determine the small chunk in which the sector address SCT is included, read the address map of the determined small chunk from the non-volatile memory 100, and store the read address map in the first memory area 211.

In operation S260, the address conversion block 220 may provide the physical address corresponding to the sector address SCT with reference to the first address table ATBL1.

In operation S270, the address conversion block 220 may load the address map of the large chunk, in which the sector address SCT is included, from the non-volatile memory 100 to the second memory area 212.

In operation S280, the address conversion block 220 may provide the physical address corresponding to the sector address SCT with reference to the second address table ATBL2.

According to an embodiment of the present invention, the address information corresponding to the hot data may be stored in the first memory area 211, which is exclusively used by the address conversion block 220. The address information corresponding to the cold data may be stored in the second memory area 212 shared by the address conversion block 220 and the function blocks 231 to 23n. Accordingly, the address information corresponding to the hot data may be preserved, and the storage space of the RAM 210 may be effectively used.

Figure 12:
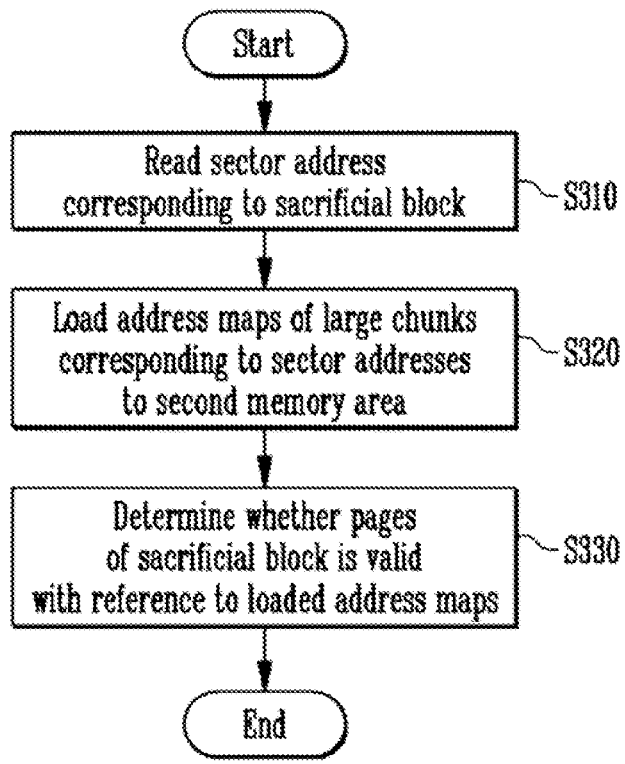
FIG. 12 is a flowchart for describing another application example of the operation method of the address conversion block shown in FIG. 1.
Figure 13:
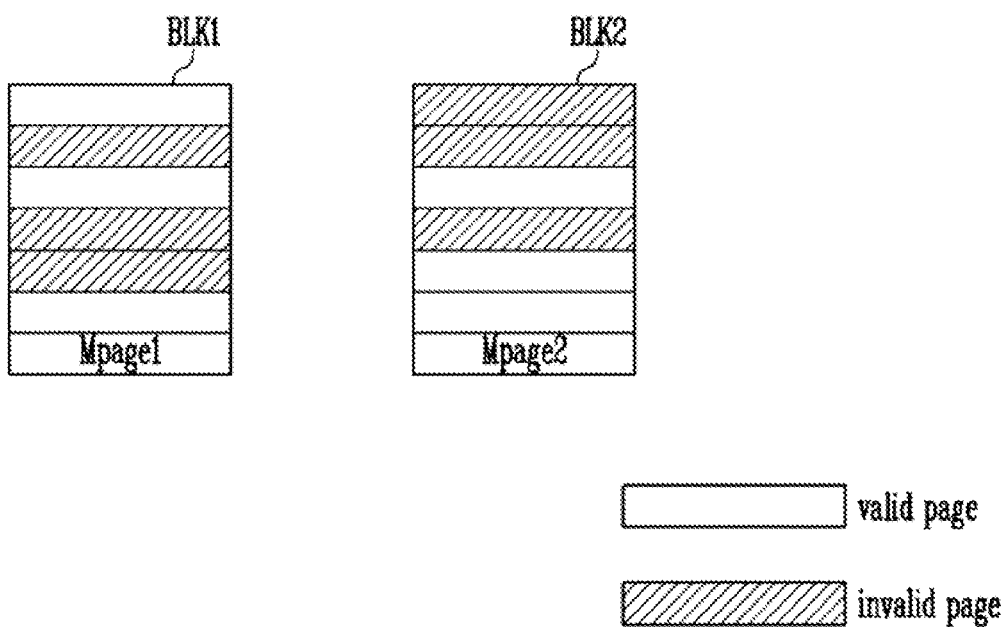
FIG. 13 is a diagram illustrating sacrificial blocks in garbage collection.

FIG. 12 is a flowchart for describing another application example of the operation method of the address conversion block 220. FIG. 13 is a diagram illustrating sacrificial blocks BLK1 and BLK2 in garbage collection.

According to an embodiment of the present invention, the address information required in the garbage collection may be loaded to the second memory area 212.

Describing FIG. 12 with reference to FIG. 13, in operation S310, the address conversion block 220 may read sector addresses corresponding to the sacrificial blocks BLK1 and BLK2.

As an embodiment, each memory block of the memory cell array 110 (see FIG. 1) may include at least one meta page, and the sector addresses corresponding to the pages included in a corresponding memory block may be stored in the meta page. In this case, the address conversion block 220 may read the meta pages Mpage1 and Mpage2 included in the sacrificial blocks BLK1 and BLK2, respectively.

As another embodiment, the sector addresses corresponding to the pages of each memory block may be stored in a predetermined memory block of the memory cell array 110. In this case, the address conversion block 220 may read the predetermined memory block.

In operation S320, the address conversion block 220 may load the address maps of the large chunks corresponding to the read sector addresses to the second memory area 212. The address conversion block 220 may determine the large chunk corresponding to each of the sector addresses, and load the address map of the determined large chunk to the second memory area 212.

In operation S330, the address conversion block 220 may determine whether valid data is stored in the pages of the sacrificial blocks BLK1 and BLK2 with reference to the loaded address maps. For example, the address conversion block 220 may determine the physical address mapped to each sector address with reference to the address maps, and determine whether the determined physical address indicates the page of the sacrificial block. If so, a corresponding page may be a page (a valid page) storing valid data. If not, the corresponding page may be a page (an invalid page) storing invalid data.

When there no invalid page determined during a predetermined time, the probability that the valid page in the corresponding memory block is not frequently accessed may be high. According to an embodiment of the present invention, the address information related to the sacrificial blocks may be loaded to the second memory area 212. Accordingly, the garbage collection may be performed in a state in which the integrity of the address information of the first memory area 211 is maintained.

Figure 14:
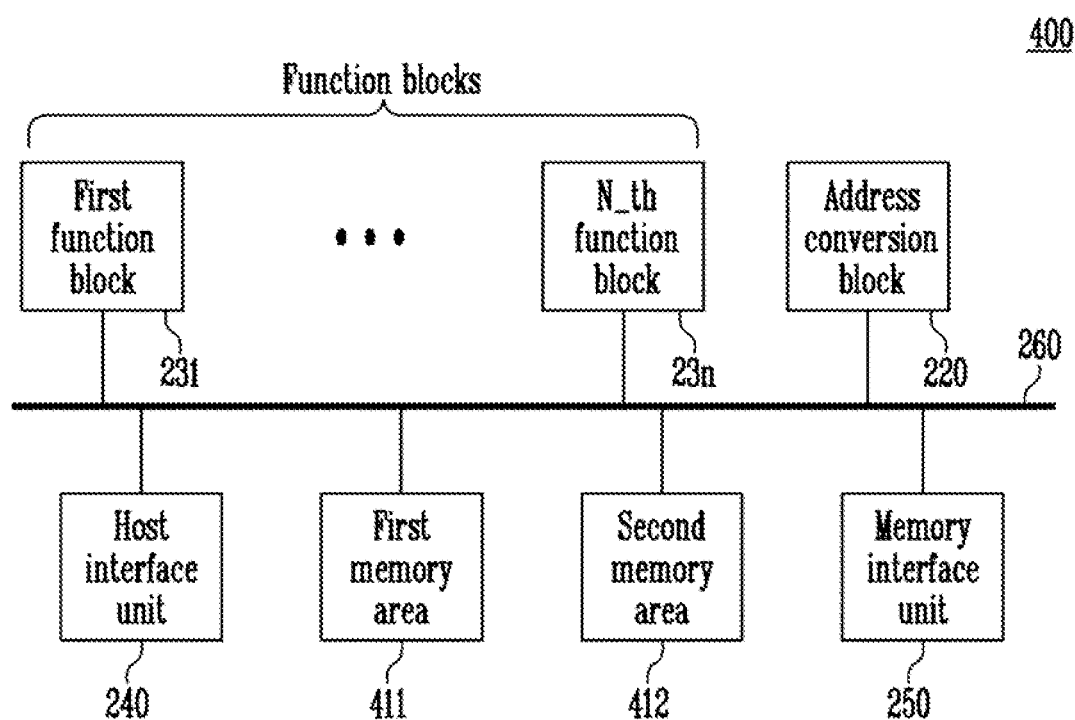
FIG. 14 is a block diagram illustrating a modified embodiment of a controller of FIG. 1.

FIG. 14 is a block diagram illustrating a modified embodiment 400 of a controller 200 of FIG. 1.

Referring to FIG. 14, the controller 400 may include an address conversion block 220, first to n-th function blocks 231 to 23n, a host interface unit 240, a memory interface unit 250, and first and second memory areas 411 and 412.

The address conversion block 220, the first to n-th function blocks 231 to 23n, the host interface unit 240, and the memory interface unit 250 are described similarly with reference to FIG. 1. Hereinafter, a duplicate description will be omitted.

The first and second memory areas 411 and 412 may be included in different RAMs. That is, the memory areas according to an embodiment of the present invention may be included in different RAMs like the first and second memory areas 411 and 412, and may be included in the same RAM like the first and second memory areas 211 and 212 of FIG. 1.

Figure 15:
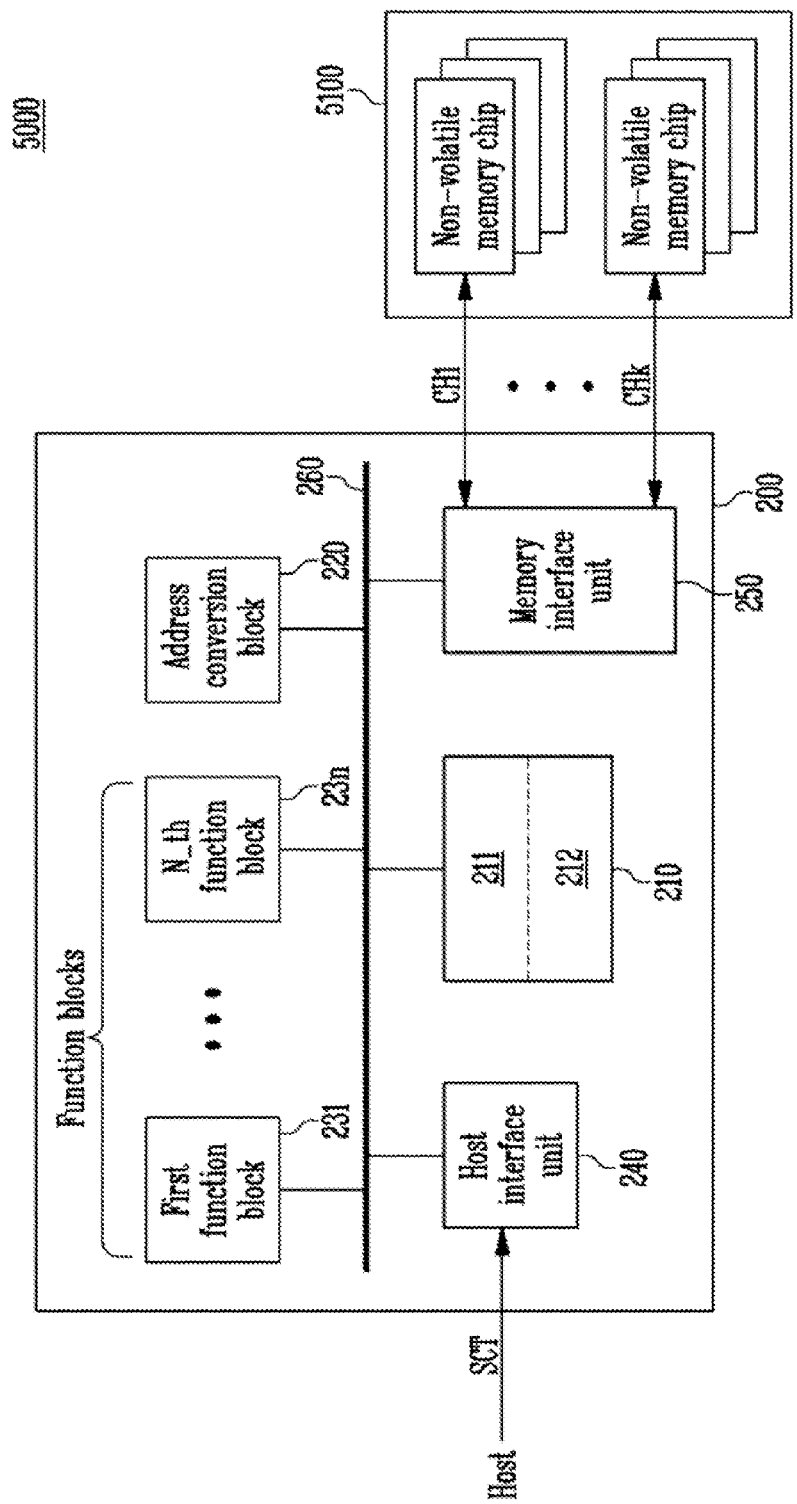
FIG. 15 is a block diagram illustrating an application example of the semiconductor device of FIG. 1.

FIG. 15 is a block diagram illustrating an application example 5000 of the semiconductor device 1000 of FIG. 1.

Referring to FIG. 15, the semiconductor device 5000 may include a non-volatile memory 5100 and a controller 200.

The non-volatile memory 5100 may include a plurality of non-volatile memory chips. Each of the plurality of non-volatile memory chips may have the same construction and operation as the non-volatile memory 100 described with reference to FIG. 1.

The plurality of non-volatile memory chips may be divided into a plurality of groups. The plurality of groups may communicate with the controller 200 through first to k-th channels CH1 to CHk, respectively.

Each of the plurality of groups may communicate with the controller 200 through one common channel. The controller 200 may have the same construction as the controller 200 described with reference to FIG. 1, and may control the plurality of non-volatile memory chips of the non-volatile memory 5100 through the plurality of channels CH1 to CHk.

In FIG. 15, a plurality of non-volatile memory chips are connected to one channel. However, it will be understood that the semiconductor device 5000 is modified so that one non-volatile memory chip is connected to one channel.

The controller 200 and the non-volatile memory 5100 may be integrated into a single semiconductor device. As an exemplary embodiment, the controller 200 and the non-volatile memory 5100 may configure a memory card as the single semiconductor device. For example, the controller 200 and the non-volatile memory 5100 may configure a memory card such as a personal computer memory card international association (PCMCIA) card, a compact flash (CF) card, a smart media (SM) card (SMC), a memory stick, an MMC, a reduced sized MMC (RS-MMC), a micro sized MMC (MMCmicro), a secure digital (SD) card, a mini SD (miniSD) card, a micro SD (microSD) card, an SD high capacity (SDHC) card, a universal flash storage (UFS) device, or the like.

The controller 200 and the non-volatile memory 5100 may configure a solid state drive (SSD) by being integrated into a single semiconductor memory device. The SSD may include a storage device configured to store data in the semiconductor memory device. When the memory system 5000 is used as the SSD, the operating speed of the host connected to the memory system 5000 may be dramatically improved.

As another exemplary embodiment, the memory system 5000 may be provided as one among various components of an electronic device such as a computer, an ultra mobile personal computer (UMPC), a workstation, a net-book, a personal digital assistant (PDA), a portable computer, a web tablet, a smart phone, an e-book, a portable multimedia player (PMP), a portable game console, a navigation device, a black box, a digital camera, a three-dimensional television, a digital audio recorder, a digital audio player, a digital picture recorder, a digital picture player, a digital video recorder, a digital video player, a device for wirelessly transmitting and receiving information, various electronic devices configuring a home network, a computer network, or a telematics network, a radio frequency identification (RFID) device, or various components configuring a computing system.

As an exemplary embodiment, the non-volatile memory 5100 or the memory system 5000 may be packaged as various types of packages. For example, the non-volatile memory 5100 or the memory system 5000 may be packaged and mounted in a manner such as a package on package (POP), a ball grid array (BGA), a chip scale package (CSP), a plastic leaded chip carrier (PLCC), a plastic dual in line package (PDIP), a die in waffle pack, a die in wafer form, a chip on board (COB), a ceramic dual in line package (CERDIP), a plastic metric quad flat package (MQFP), a thin quad flat package (TQFP), a small outline integrated circuit (SOIC), a shrink small outline package (SSOP), a thin small outline package (TSOP), a system in package (SIP), a multi chip package (MCP), a wafer-level fabricated package (WFP), a wafer-level processed stack package (WSP), or the like.

According to an embodiment of the present invention, the size of the RAM in the controller may be decreased and the operating speed of the controller may be improved.

In the drawings and specification, there have been disclosed typical exemplary embodiments of the invention and, although specific terms are employed, they are used in a generic and descriptive sense only and not for the purpose of limitation. As for the scope of the invention, it is to be set forth in the following claims. Therefore, it will be understood by those of ordinary skill in the art that various changes in form and detail may be made without departing from the spirit and scope of the present invention as defined by the following claims.

What is claimed is:

1. A controller controlling a non-volatile memory, comprising:
a first memory area configured to store a first address table;
a second memory area configured to store a second address table;
an address conversion block configured to access the first and second memory areas, and converting a sector address received from a host into a physical address corresponding to the non-volatile memory with reference to the first and second address tables; and
one or more function blocks configured to share the second memory area with the address conversion block,
wherein the first memory area is exclusively used by the address conversion block,
wherein the address conversion block loads address maps in units of small chunks from the non-volatile memory to the first memory area to generate the first address table, the small chunk including M number of sector addresses, and wherein the address conversion block loads address maps in units of large chunks from the non-volatile memory to the second memory area to generate the second address table, the large chunk including N, which is greater than M, number of sector addresses.

2. The controller of claim 1, wherein the address conversion block determines a small chunk that includes the sector address received from the host, and searches for the determined small chunk in the first address table.

3. The controller of claim 2, wherein, when the determined small chunk is searched in the first address table, the address conversion block converts the sector address received from the host into the physical address with reference to an address map of a searched small chunk, and when the determined small chunk is not searched in the first address table, the address conversion block determines a large chunk that includes the sector address received from the host, and searches for the determined large chunk in the second address table.

4. The controller of claim 3, wherein the address conversion block converts the sector address received from the host into the physical address with reference to an address map of a searched large chunk.

5. The controller of claim 1, wherein, when the sector address received from the host corresponds to hot data, the address conversion block determines a small chunk in which the sector address received from the host is included, reads an address map of a determined small chunk from the non-volatile memory, and updates a read address map in the first address table.

6. The controller of claim 5, wherein the address conversion block determines the physical address with reference to an updated address map of the small chunk.

7. The controller of claim 1, wherein, when the sector address received from the host corresponds to cold data, the address conversion block determines a large chunk that includes the sector address received from the host, reads an address map of the determined large chunk from the non-volatile memory, and updates a read address map in the second address table.

8. The controller of claim 7, wherein the address conversion block determines the physical address with reference to an updated address map of the large chunk.

9. The controller of claim 1, wherein, in a garbage collection, the address conversion block reads sector addresses corresponding to a sacrificial block in the non-volatile memory, determines large chunks in which read sector addresses are included, and loads address maps of determined large chunks to the second memory area.

10. The controller of claim 9, wherein the address conversion block determines whether each of pages of the sacrificial block is valid with reference to loaded address maps.

11. The controller of claim 10, further comprising:
a garbage collection block configured to read data of valid pages in the sacrificial block, and write read data to pages of a target block in the non-volatile memory.

12. The controller of claim 1, wherein the first address table includes address maps divided in units of small chunks, each small chunk including M number of sector addresses, and
the second address table includes address maps divided in units of large chunks, each large chunk including N, which is greater than M, number of sector addresses.

13. The controller of claim 12, wherein each of the address maps of the first address table includes physical addresses mapped to the M sector addresses.

14. The controller of claim 12, wherein each of the address maps of the second address table includes physical addresses mapped to the N sector addresses.

15. A semiconductor device, comprising:
a non-volatile memory; and
a controller configured to control the non-volatile memory,
wherein the controller comprises:
a first memory area configured to store a first address table;
a second memory area configured to store a second address table;
an address conversion block configured to access the first and second memory areas, and convert a sector address received from a host into a physical address corresponding to the non-volatile memory with reference to the first and second address tables; and
one or more function blocks configured to share the second memory area with the address conversion block,
wherein the first memory area is exclusively used by the address conversion block,
wherein the address conversion block loads address maps in units of small chunks from the non-volatile memory to the first memory area to generate the first address table, the small chunk including M number of sector addresses, and
wherein the address conversion block loads address maps in units of large chunks from the non-volatile memory to the second memory area to generate the second address table, the large chunk including N, which is greater than M, number of sector addresses.

16. The semiconductor device of claim 15, wherein the non-volatile memory includes a memory cell array configured to store address information, and the address conversion block selectively loads the address information, and generates the first and second address tables.

17. A semiconductor device, comprising:
a non-volatile memory including a memory cell array; and
a controller configured to control the non-volatile memory,
wherein the controller comprises:
a first memory area configured to store a first address table including small chunks of first address maps;
a second memory area configured to store a second address table including large chunks of second address maps;
an address conversion block configured to selectively load address information of the memory cell array as the first and second address tables and convert a sector address received from a host into a physical address corresponding to the memory cell array with reference to the first and second address tables; and
one or more function blocks configured to share the second memory area with the address conversion block, but not share the first memory area with the address conversion block,
wherein the first memory area is exclusively used by the address conversion block,
wherein the address conversion block loads address maps in units of small chunks from the address information to the first memory area and generates the first address table, the small chunk including M number of sector addresses, and
wherein the address conversion block loads address maps in units of large chunks from the address information to the second memory area and generates the second address table, the large chunk including N, which is greater than M, number of sector addresses.

* * * * *